United States Patent [19]
Tarver, III

[11] Patent Number: 6,009,955
[45] Date of Patent: *Jan. 4, 2000

[54] ENHANCED MINIMUM TILLAGE PLANTER/RENOVATOR SYSTEM

[76] Inventor: Sam A. Tarver, III, 84636 Hwy 25, Folsom, La. 70437

[*] Notice: This patent is subject to a terminal disclaimer.

[21] Appl. No.: 09/169,496

[22] Filed: Oct. 9, 1998

Related U.S. Application Data

[63] Continuation-in-part of application No. 08/829,439, Mar. 28, 1997, Pat. No. 5,819,855, and application No. 60/014,248, Mar. 28, 1996.

[51] Int. Cl.[7] ............................. A01B 49/02; A01B 61/00
[52] U.S. Cl. ............................................ 172/166; 172/156
[58] Field of Search ............................. 111/52, 120, 121, 111/122, 140, 135, 186; 172/156, 158, 151, 166, 256, 178, 600, 601, 602, 603

[56] References Cited

U.S. PATENT DOCUMENTS

| | | |
|---|---|---|
| 330,022 | 11/1885 | Harter . |
| 3,071,327 | 1/1963 | Krumbolz . |
| 3,327,786 | 6/1967 | Mever . |
| 3,335,681 | 8/1967 | Main et al. . |
| 3,491,709 | 1/1970 | Fleischer et al. . |
| 3,658,018 | 4/1972 | Conner . |
| 3,673,970 | 7/1972 | Hatcher . |
| 3,811,387 | 5/1974 | Meiners . |
| 4,048,929 | 9/1977 | Zumbahlen . |
| 4,131,221 | 12/1978 | Yeager . |
| 4,212,254 | 7/1980 | Zumbahlen . |
| 4,213,408 | 7/1980 | West et al. . |
| 4,244,306 | 1/1981 | Peterson et al. . |
| 4,245,706 | 1/1981 | Dietrich, Sr. . |
| 4,261,593 | 4/1981 | Yeager . |
| 4,267,783 | 5/1981 | Hendrix et al. . |
| 4,277,581 | 7/1981 | Klotzbach . |
| 4,406,329 | 9/1983 | Schlueter . |
| 4,407,371 | 10/1983 | Hohl . |
| 4,550,122 | 10/1985 | David et al. . |
| 4,677,922 | 7/1987 | Shrull et al. . |
| 4,762,075 | 8/1988 | Halford . |
| 5,025,736 | 6/1991 | Anderson . |
| 5,027,724 | 7/1991 | Ptacek et al. . |
| 5,477,792 | 12/1995 | Rassett et al. . |
| 5,623,997 | 4/1997 | Rawson et al. . |

OTHER PUBLICATIONS

Triplett, Glover B., Jr. and Van Doren, David M., Jr., "Agriculture Without Tillage", pp. 28–33 (no other information available) (no date).

*Primary Examiner*—Robert E. Pezzuto
*Attorney, Agent, or Firm*—Joseph T. Regard, Ltd

[57] ABSTRACT

A minimum tillage planting/renovation system configured to facilitate an enhanced seedbed in a variety of soil conditions, while maintaining nominal surface disturbance. The present invention may further be configured to provide intercrop planting, renovating, and/or fertilizing. The system of the present invention contemplates a planter/fertilizer wherein there is provided a ripping point configured to penetrate a predetermined depth into the soil or sod, the ripping point designed to facilitate a splitting and lifting of the soil, forming a seed bed void, while cutting any organic ground cover, which might comprise, for example, sod, widening the ground cover, and lifting same to a prominent head, wherein first and second coulters, situated above and about the ripping point, are configured to independently engage and cut first and second sides of the lifted ground cover, trash and the like, respectively, then cutting the lifted ground cover, etc., as the coulters rotate, the coulters cooperatively grinding at least a portion of the lifted ground cover, forming tilth, and redepositing the tilth into the seedbed void, providing an enhanced seedbed region with nominal surface disturbance, and a clean furrow.

20 Claims, 9 Drawing Sheets

ENHANCED MINIMUM TILLAGE PLANTER/RENOVATOR SYSTEM

STATEMENT OF CONTINUING APPLICATION

The present invention is a continuation-in-part of U.S. Provisional Patent Application No. 60/014,248, filed Mar. 28, 1996, listing as the inventor Sam A. Tarver, III, entitled "No Till Heel Mole Plow", and U.S. Utility Patent application No. 08/829,439 filed Mar. 28, 1997, now U.S. Pat. No. 5,819,855 entitled "Enhanced Minimum Tillage Planter/Renovator System".

TECHNICAL FIELD OF THE INVENTION

This invention relates to a cultivation equipment and methods, and in particular to a minimum tillage planting/renovation system configured to facilitate an enhanced seedbed in a variety of soil conditions, while maintaining nominal surface disturbance. The present invention may further be configured to provide intercrop planting, renovating, and/or fertilizing.

The system of the present invention contemplates a planter/fertilizer wherein there is provided a ripping point configured to penetrate a predetermined depth into the soil or sod, the ripping point designed to facilitate a splitting and lifting of the soil, forming a seed bed void, while cutting any organic ground cover, which might comprise, for example, sod, widening the ground cover, and lifting same to a prominent head, wherein first and second coulters, situated above and about said ripping point, are configured to independently engage and cut first and second sides of the lifted ground cover, trash and the like, respectively, then cutting the lifted ground cover, etc., as the coulters rotate, the coulters cooperatively grinding at least a portion of said lifted ground cover, forming tilth, and redepositing the tilth into the seedbed void, providing an enhanced seedbed region with nominal surface disturbance, and a clean furrow.

BACKGROUND OF THE INVENTION

The general concept of minimum tillage planter/renovators is not new, and many patents have issued over the years for various attempts at providing an enhanced seedbed, without the necessity of disturbing the ground surface, which might comprise, for example, sod or the like.

However, when conventional minimum tillage planters are utilized with soft or spongy ground, the furrow and seedbed is formed, only to have it shrink, with the furrow providing little open area on the ground cover for sunlight and passage of the seedlings therethrough.

Therefore, there exists a need for a minimum tillage planter/renovator system which is able to displace the ground cover during planting, while uplifting, displacing, and grinding the displaced soil and ground cover so that it allows the formation of a wider, finer, less dense seedbed with finer tilth, and does not shrink back to form a narrow furrow, while minimizing disturbance of the ground cover.

While none of the below cited patents are believed to teach the concepts embodied in the present invention, the following patents were deemed at least generally pertinent to the teachings minimum tillage planting or the like:

| Patent Number | Inventor(s) | Date of Issue |
|---|---|---|
| 5413056 | Freed et al | 05/09/1995 |
| 5375542 | Schaffer | 12/27/1994 |
| 5279236 | Truax | 01/18/1994 |
| 5255617 | Williams | 10/26/1993 |

-continued

| Patent Number | Inventor(s) | Date of Issue |
|---|---|---|
| 4779684 | Schultz | 10125/1988 |
| 4729435 | Urich | 03/08/1968 |
| 4537251 | Hatzell | 08/27/1985 |
| 4336844 | Heibig et al | 01/29/1982 |
| 4245706 | Dietrich, Sr. | 01/20/1981 |
| 4127073 | Blair | 11/28/1978 |
| 4057112 | Taylor | 11/08/1977 |
| 3960220 | Laitala | 06/01/1976 |

Pat. No. 4,779,684 illustrates a scouring plow (31) situated at a generally forty-five degree arrangement relative to the shank, although there are obvious differences between this patent and the searched for invention.

Pat. No. 5,255,617 illustrates a scalloped coulter situated at some oblique angle relative to the planter, which coulter is also adjustable via the support member (56).

Pat. No. 5,279,236 teaches a seed planter wherein there is provided forward of the drill a plurality of trash discs comprising angled coulters, and is provided for general information.

Pat. No. 5,375,542 teaches a seed covering system utilizing a side mounted, angled coulter.

Pat. No. 4,729,435 teaches a subsoil tilling implement wherein there is provided a coulter (30) is provided in front of the "ripper member" (22), the system further including a vertically adjustable wheel (24) adjacent to the ripper for varying the depth of the cut.

Pat. No. 3,960,220 teaches a subsoil plow which is spring supported, providing a vibratory pivotal oscillation during forward motion.

Pat. No. 4,057,112 teaches a "Subsoil Plow", wherein there is provided a plurality of plow teeth having situated there before a coulter (27). The plow teeth are supported via shear bolt and are configured to pivot upon engaging an obstacle.

Pat. No. 4,127,073 teaches a "Subsoil Tillage Tooth" wherein there is provided a shank having a tip having a generally horizontal edge, and a cusp (54) in the medial area of the shank, as well as a winged trailing member (30), providing cutting blades for severing roots, "and to create a broken soil cap and moisture retaining blanket".

Pat. No. 4,245,706 teaches the utilization of shank like members having a top including wing-like work surfaces situated at the generally frontal, tip portion of the shank.

Pat. No. 4,331,204 teaches a "Tillage Implement" wherein there is provided, as shown in FIG. 3, a shank member having a generally horizontal leading edge (78), and first and second opposing wing-like cutting members (82).

Pat. No. 4,336,844 issued 1982, teaches a chisel having a generally horizontal leading edge, the shank having mounted thereupon a lister (41), configured to form an enhanced bed.

Pat. No. 5,413,056 teaches a no-till planter utilizing angled coulters, although the configuration is noticeably different from the present invention.

Pat. No. 4,230,054 as relating to a coulter (13) situated adjacent to the shank, for "smoothing" the soil.

Pat. Nos. 3,707,132, 3,854,429, and Austrian 27361, for mole plow-like members rearwardly disposed of the shank.

Pat. Nos. 4,638,748 and 4,592,294 relating scouring plow-like members disposed to the rear of the shank.

Lastly, Pat. No. 3,122,111 contemplating a curved surfaced coulter to provide an off-axis cut relative to the boot. Further included area soil spreaders (83, 81) adjacent to the boot, and a soil packer (89) following the boot.

Figure 1:
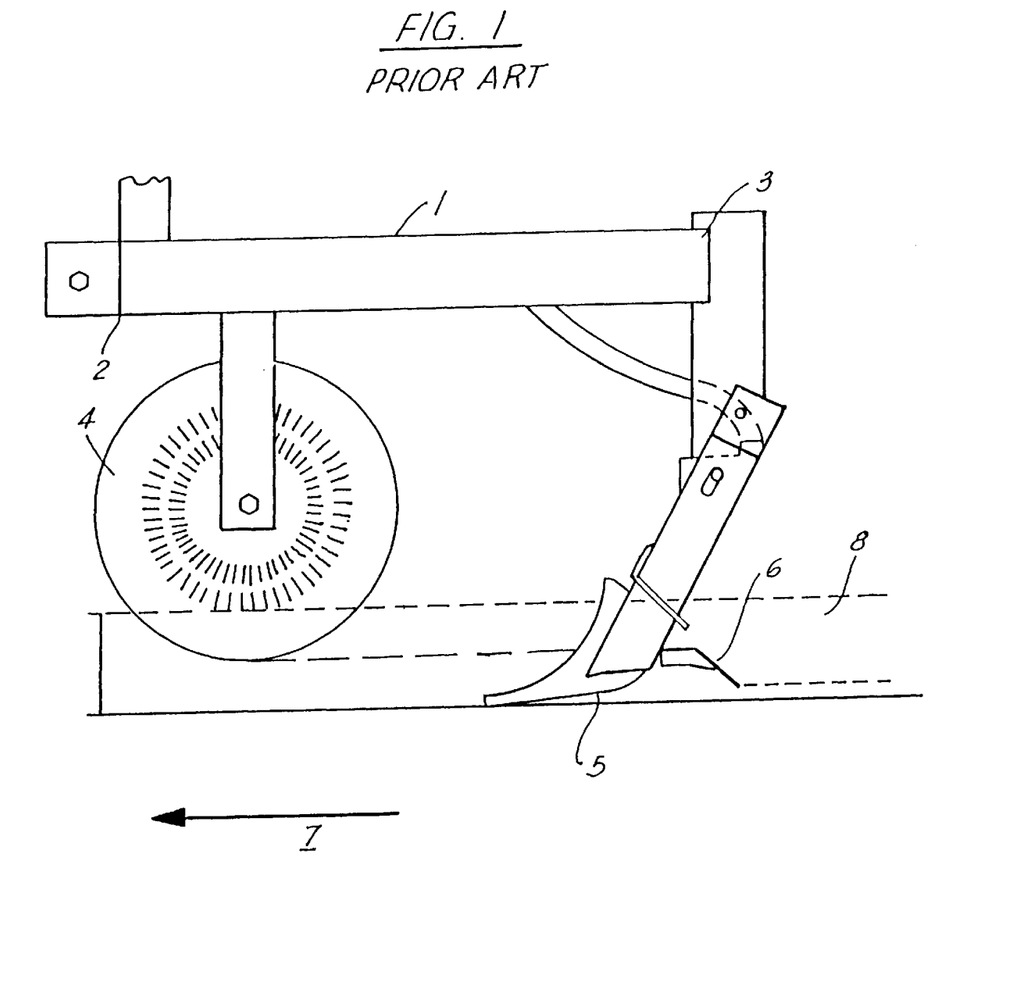
FIG. 1 is a side view of an exemplary prior art minimum tillage planter.
Figure 2:
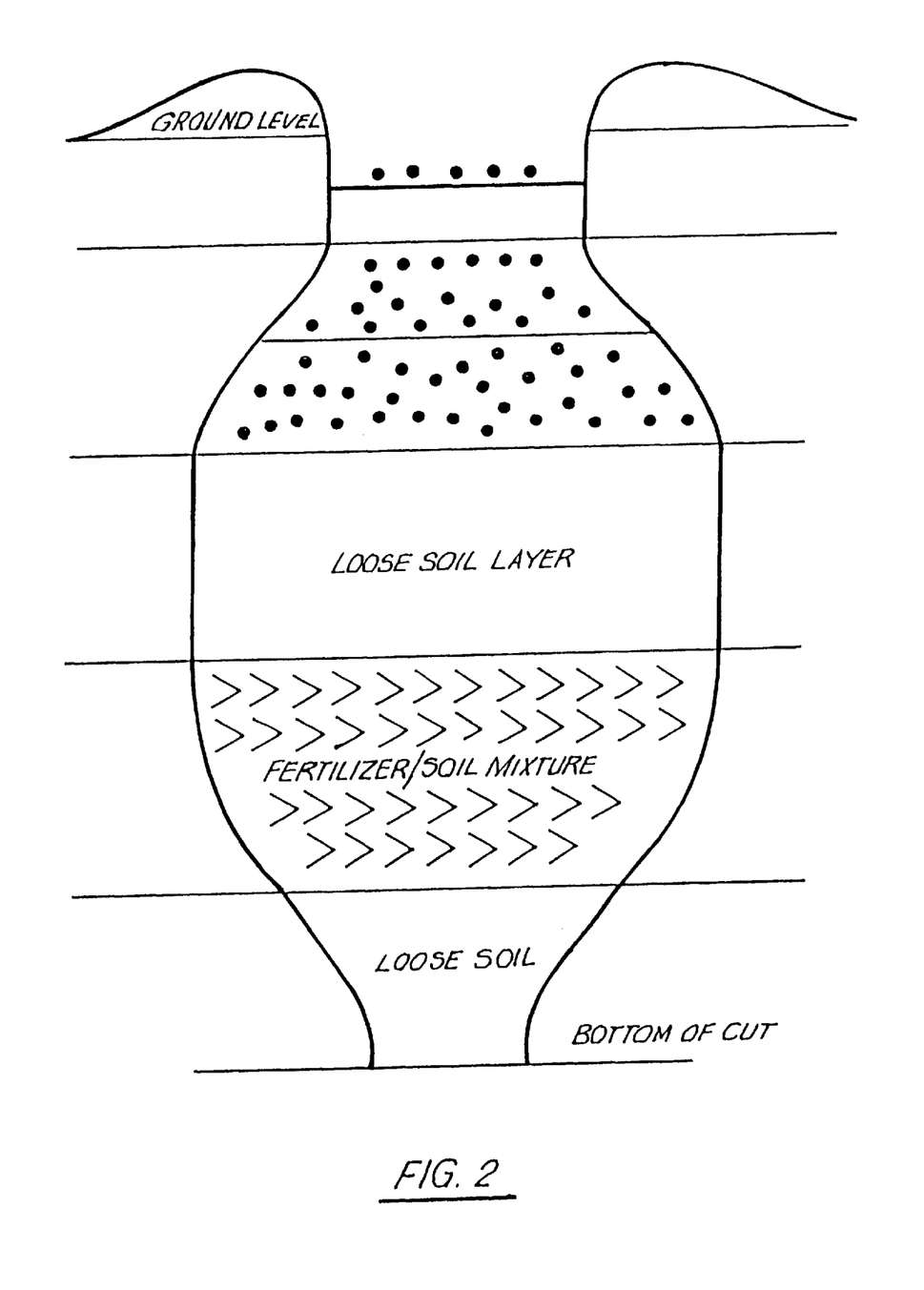
FIG. 2 is a cross-sectional view of an exemplary furrow and seed bed formed by the present invention even in soft, spongy soil, which provides a significantly wider furrow and seed bed, with finer tilth, as compared to a conventional minimum tillage seedbed.

FIG. 1 illustrates an example of a prior art planter, wherein there is provided a frame 1 having a front 2 and a rear 3, the front of the frame having situated there below a leading slicing coulter 4, the rear of the frame having situated below a ripping point 5 which generally would be in alignment with the coulter 4, and a mole plow 6 following the coulter. The system may be motivated 7 utilizing a tractor, via a three point hitch, which may be associated with the front 2 of the frame.

A general problem with this prior art arrangement is that the leading slicing coulter requires far too much weight to penetrate hard ground, providing an inefficient and sometimes difficult means of establishing a leading slice. Further, in soft or spongy soil conditions, the coulter may not cut trash in its path, instead burying the trash beneath the coulter, and into the path of the ripping point 5 and/or into the seedbed 8, disturbing the renovation/planting process.

In addition, in root bound and/or wet conditions sod, mostly roots, (since the roots have displaced the normal amount of soil) is springy or spongy, and will move out horizontally and not be cut away and ground up by the grinding action of the ripping point and rear mole plows. The consequence of this is that the sod/roots move back into near condition leaving a too narrow seed bed and furrow to allow sufficient plants and especially sufficient sunlight into the formed furrow for emerging plants' survival. To simply widen the point and mole plows to make the furrow wider causes the sod to explode outward and roll over giving ragged, uncontrollable, unacceptable furrows/seed beds and damages sod strip (or any ground cover) in between rows.

Thus, while the above contemplates various configurations of "no-till" planters and the like, none appear to teach or suggest a minimum tillage planter/renovator system which is able to displace the ground cover during planting, providing an open furrow without unduly disturbing the ground cover.

GENERAL SUMMARY DISCUSSION OF THE INVENTION

Unlike the prior art, the present invention contemplates a minimum tillage planter/renovator system which provides an enhanced seed bed and clean furrow, with nominal ground cover disturbance, in a variety of soil conditions. Thus, the invention provides a minimum tillage planter/renovator which provides superior performance over the prior art, while remaining cost-competitive to purchase and relatively inexpensive to operate, with relatively low maintenance.

The system of the present invention contemplates a planter/fertilizer which does not require the leading slicing coulter as shown in most prior art minimum tillage planters, thereby providing a lighter implement. The present system further contemplates a unique ripping point design, which is configured to penetrate a predetermined depth into the soil or sod, the ripping point designed to facilitate a splitting and lifting of any organic ground cover, which might comprise, for example, sod, widening the ground cover, forming a seedbed void, and lifting the displaced soil and ground cover to a prominent head, wherein first and second coulters (which may be rippled, scalloped, or otherwise), situated above and about said ripping point, are configured to independently engage and cut first and second sides of the lifted ground cover, respectively, then cut and grind the lifted ground cover, etc., as the coulters rotate, the coulters cooperatively grinding at least a portion of said lifted ground cover, forming tilth, and redepositing the tilth into the seedbed void, providing an enhanced seedbed region with nominal surface disturbance, and a clean furrow.

It is therefore an object of the present invention to provide a minimum tillage planter/renovator system which is able to displace the ground cover during planting, and provide a clean, open furrow over the seedbed, while minimizing ground cover disturbance.

It is another object of the present invention to provide a minimum tillage system which is effective in hard pack as well as soft, spongy conditions, providing an enhanced seed bed and furrow, minimizing surface disturbance, while providing intercrop planting, renovating, and/or fertilizing.

It is still another object of the present invention to provide an enhanced seed bed, which is wider than conventional minimum tillage planter seed beds, but without the surface disturbance found with conventional minimum tillage implements.

Lastly, it is an object of the present invention to provide a lighter, more compact minimum tillage planter/renovator, which works equally well in a variety of soil conditions, while providing an enhanced seed bed, a wide, clean furrow, and nominal ground cover disturbance.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein.

DETAILED DISCUSSION OF THE INVENTION

Figure 3A:
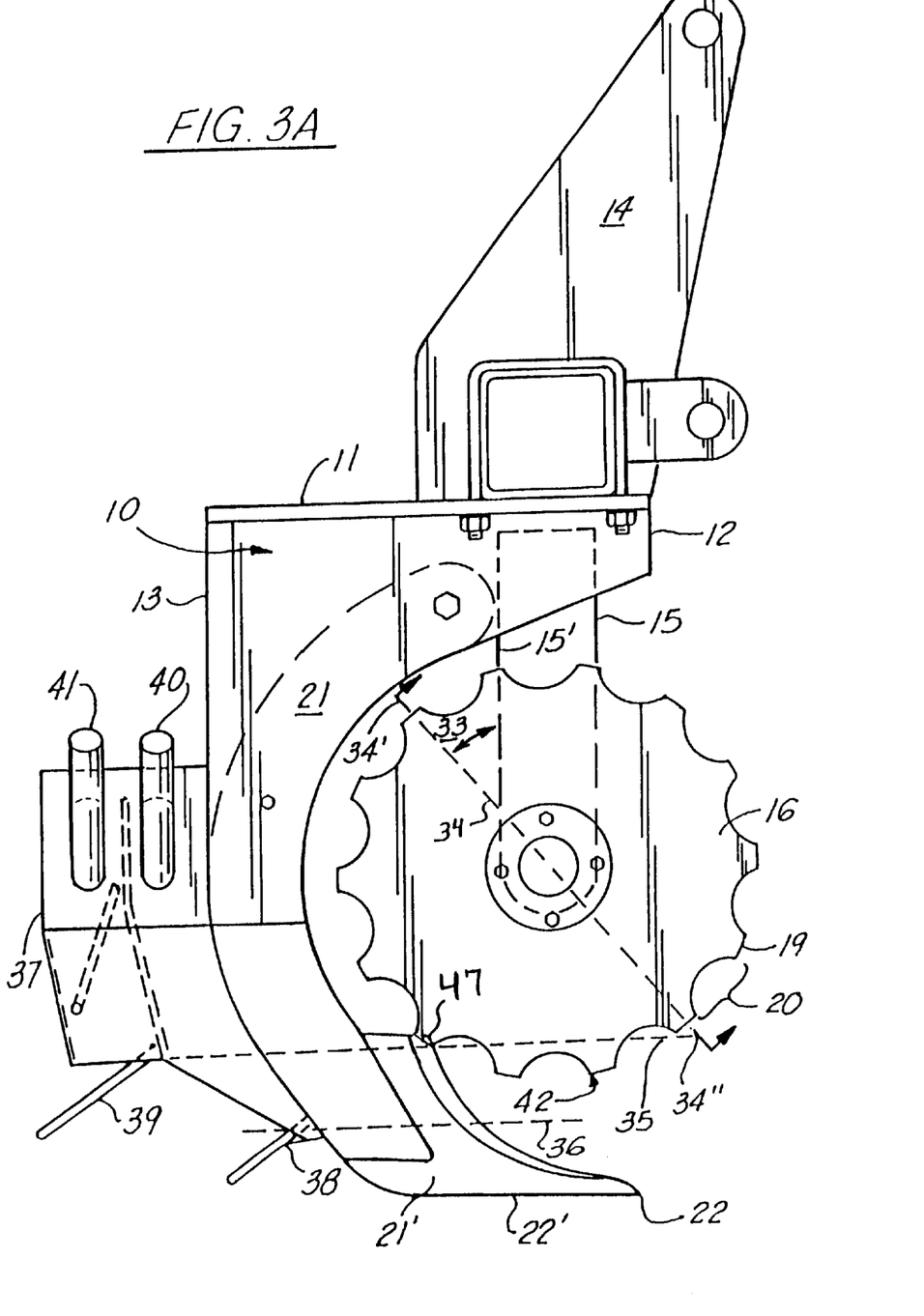
FIG. 3A is a side view of a minimum tillage planter/renovator of the present invention.
Figure 3B:
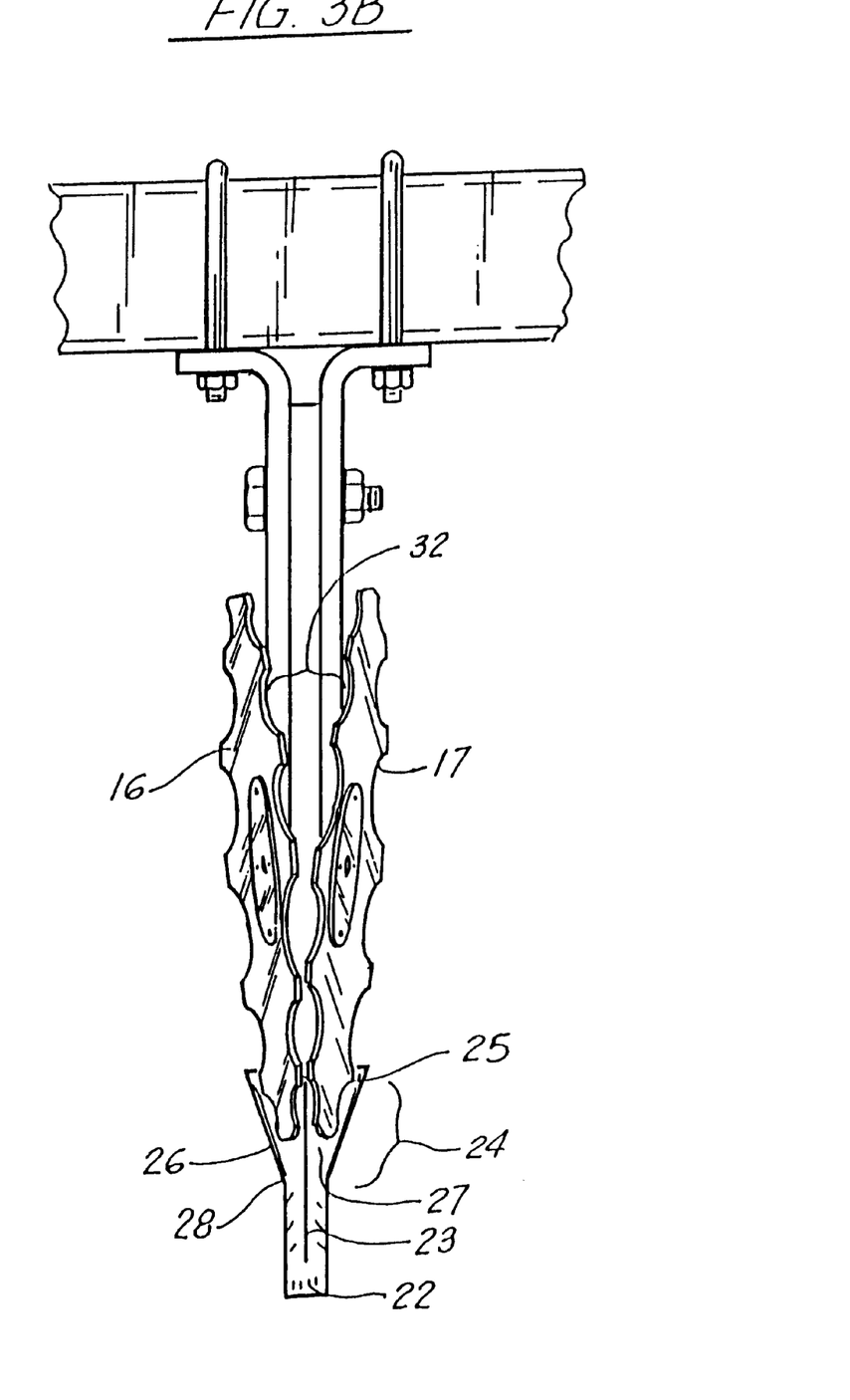
FIG. 3B is a front view of the minimum tillage planter/renovator of FIG. 3A.
Figure 3C:
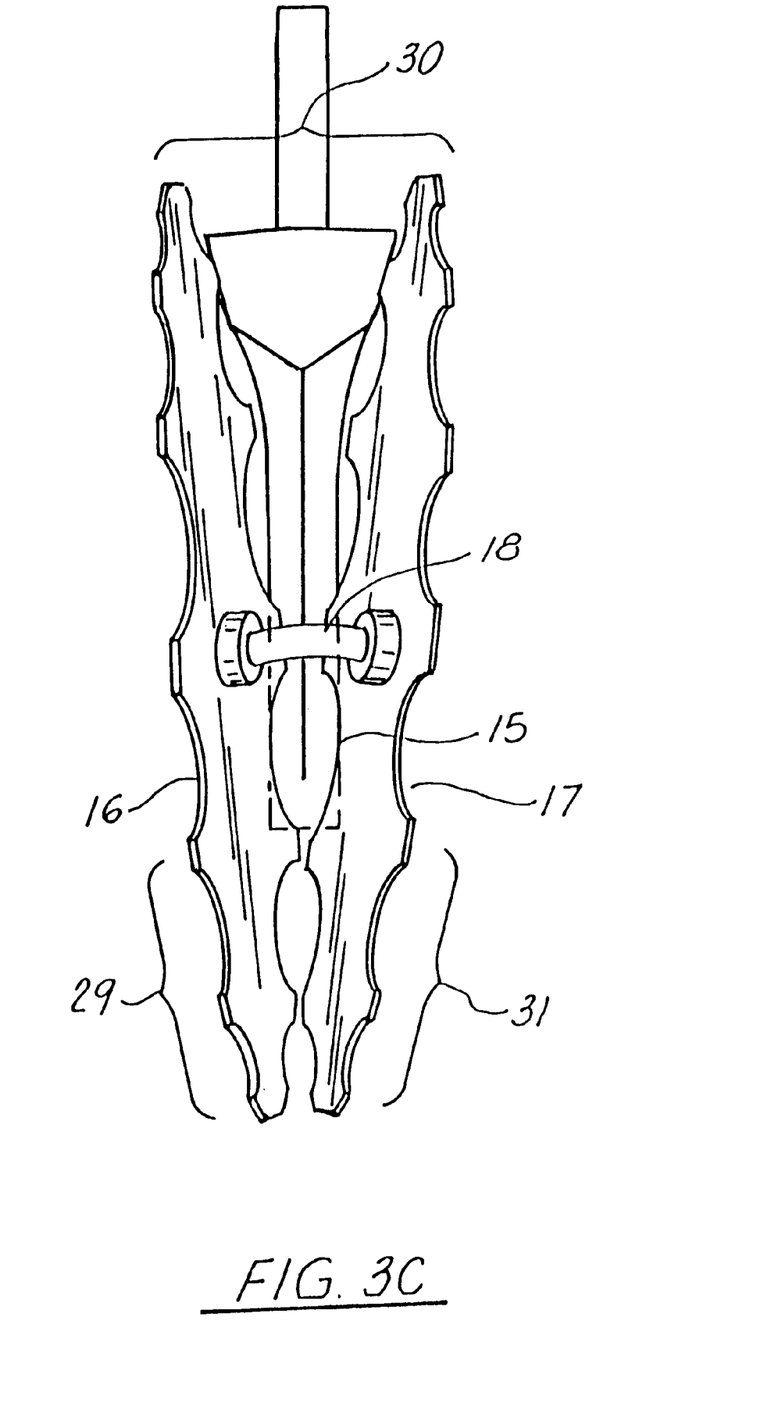
FIG. 3C is a top view of the minimum tillage planter/renovator of FIG. 3A.

Referring to FIGS. 3A–3C of the drawings, the first embodiment of the present invention teaches a minimum tillage planter/renovator which dispenses with the necessity of a leading slicing coulter (4 in FIG. 1), providing an enhanced seedbed with a lighter implement.

As shown, the minimum tillage planter/renovator 10 comprises a frame 11 having a first, frontal end 12 and a second, rear end 13. Shown atop the frame is a standard, three point hitch 14, which may be utilized by a tractor or other implement to motivate the present system.

Continuing with the drawings, emanating from the frame 11 near the first end 12 in general vertical fashion is a front vertical support member 15, configured to support first 16 and second 17 coulter discs about said vertical support member, via axle 18 in angled relationship, as will be further discussed infra. As shown, the outer diameter 19 of the coulter discs 16, 17 may be scalloped 20.

Situated behind and aligned with the front vertical support member 15 is rear vertical support member 21, supporting a foot shank 21' which curves about ninety degrees along an arc along a frontal face 24 which has an upper end situated generally above ground line 35, the frontal face, forming a spreading area which tapers from a wide upper portion 25 to a medial portion 28, to a ripping point 22 which has a point somewhat perpendicular in relation to the frontal support member.

The curved arc forming the frontal face 24 of the foot shank (which arc may vary, and may even be linear, depending upon the operating criteria) forms a lifting edge 23 for lifting soil during the operation of the system, which will be further described infra.

The present embodiment of the foot shank has a frontal face 24 which is divided into first 26 and second 27 faces to enhance cutting and dividing of the soil to form the furrow and seedbed.

Continuing with FIGS. 3A–3C, the first 16 and second 17 discs are supported via axle 18 at an angle 33 along a line 34 which is situated about forty-five degrees relative to the rear edge 15' of the front vertical support member 15 (or the horizontal, as exemplified in the ground line 35), wherein the first and second discs are angled relative to one another 32 at about between 4 and 25 degrees, in the practice embodiment, generally about 6 or 7 degrees, bringing the first and second discs outer diameter 19 (which outer diameter is in the exemplary embodiment 13") close together 29 (which could comprise a spacing of about, for example, ⅛" to ½") at the first end 34" of line 34, and at their widest spaced point 30 at the second end 34' of line 34, an exemplary spacing of about, for example, 4 to 5 inches; further, at 7 degrees, the outer diameter of the exemplary embodiment of the discs at the tip of the foot shank 47 is spaced at just, for example, ⅜", with the discs spaced at about 3" apart above the tip of the foot shank 47.

The first end 34" of line 34 corresponds generally with, slightly above, or slightly below the anticipated ground line 35 of the system when in use, so that the discs may communicate with the ground cover initially at their closest point relative to one another, together forming a splitting and cutting, leading edge 31 with the lowest portion 42 of the discs under the ground line 35 found generally below the front vertical support member 15.

Situated generally below the second end 13 of the frame 11 is a planter component 37 which may include, for example, first and second seed/fertilizer conduits 40, 41, configured to place seed/fertilizer in a furrow formed by the system, in the vicinity of, for example, first 38 and second 39 mole plows, respectively. The mole plows may be staggered to provided seed/fertilizer at varying levels in the furrow; for example, the first 38 mole plow may emanate from the planter component along a line 36 corresponding with the approximate midpoint of foot shank 21', while the second 39 mole plow may emanate from the planter component at about the ground line 35, with the mole plows themselves comprising plow members situated at generally about a forty five degree angle relative to the horizontal, and configured as is generally practiced in the art.

In the present, first exemplary embodiment of the invention, the two coulters are 13" in diameter with scalloped cutting edges, as earlier indicated, although other diameter coulters may be employed in different scale systems and/or different operating conditions, with similar positive results. The 13" diameter has a needed radius proportioned to the size and the arc of the point for the scale of the exemplary embodiment, and may vary depending upon soil conditions and performance criteria. The center or axle of the coulters is placed vertically (directly) over a point 1⅞" back from the leading edge of the exemplary ripping point of the exemplary embodiment of the present invention, which comprises is publicly available from Tarver Sales Corp of Folsom, LA as part number TD 99, which is incorporated herein by reference.

In use, referring to FIG. 4, the ripping point penetrates the ground such that the front vertical support member 15 is situated in a generally vertical position, and the ripping point 22 forms a generally horizontal leading edge about, for example, 4–6½", or, for example, about 5½" approximately below ground line 35. The ripping point breaks apart the sod and ground as it is spread by the lifting edge 23 and tapered spreading area 24 of the foot shank 21'. In addition, the breaking apart and lifting action precedes (out front) the ripping point 22 by a distance, under some soil conditions, of several inches, starting its lifting, heaving, and parting action of the soil, providing an upward thrust 43.

The upward thrust 43 caused by the ripping point, lifting edge, and spreading area of foot shank 21' raises the sod/soil and all the trash laying on top of the surface up into the leading edge 31 formed by first 16 and second 17 disc coulters, causing it to be sliced. The slicing action caused by this configuration eliminates the need for the leading slicing coulter (4 in FIG. 1) known in the past and the carrying of all the weight necessary for penetration. The slicing action of the trash, roots and hard soil (material) obtained here between the ripping point and dual coulters is positive even in wet, sandy, soft, sod conditions. The old leading coulter would bury trash down into the soil under those conditions without cutting it. This caused blockage of the ripping point and necessitated cleaning by hand.

The dual slicing coulters of the present invention, on the other hand, provides a leading edge slicing, spreading, and grinding action via the rotation of the scalloped edges of the discs, at first cutting the ground cover at the leading edge, then spreading and grinding the split ground cover, with the movement 44 of the system, as the foot shank and ripping point lifts the soil and ground cover, while forming the furrow.

The ripping point of the present embodiment of the present invention penetrates about 5½" into the ground, lifts the soil and ground cover to be engaged by the disc coulters, further lifts and splits the soil, forming a furrow, and the ripping point arcs up and widens out rather harshly creating a blunt, prominent head.

In the present embodiment of the invention, the angle of the "V" shape forming the upper lifting end of the foot shank is continued out only approximately 65% of its widening travel before the degree of the angle is abruptly reduced as the head continues to widen to its total width.

Further, the exemplary embodiment of the coulters are each angled out from a vertical line through their axle 18 (FIG. 3C) at about, for example, seven degrees (with the 13" exemplary coulter) creating a spacing between themselves of approximately 1½" at the lowest point 42, and approximately 3" apart at the top.

Figure 4:
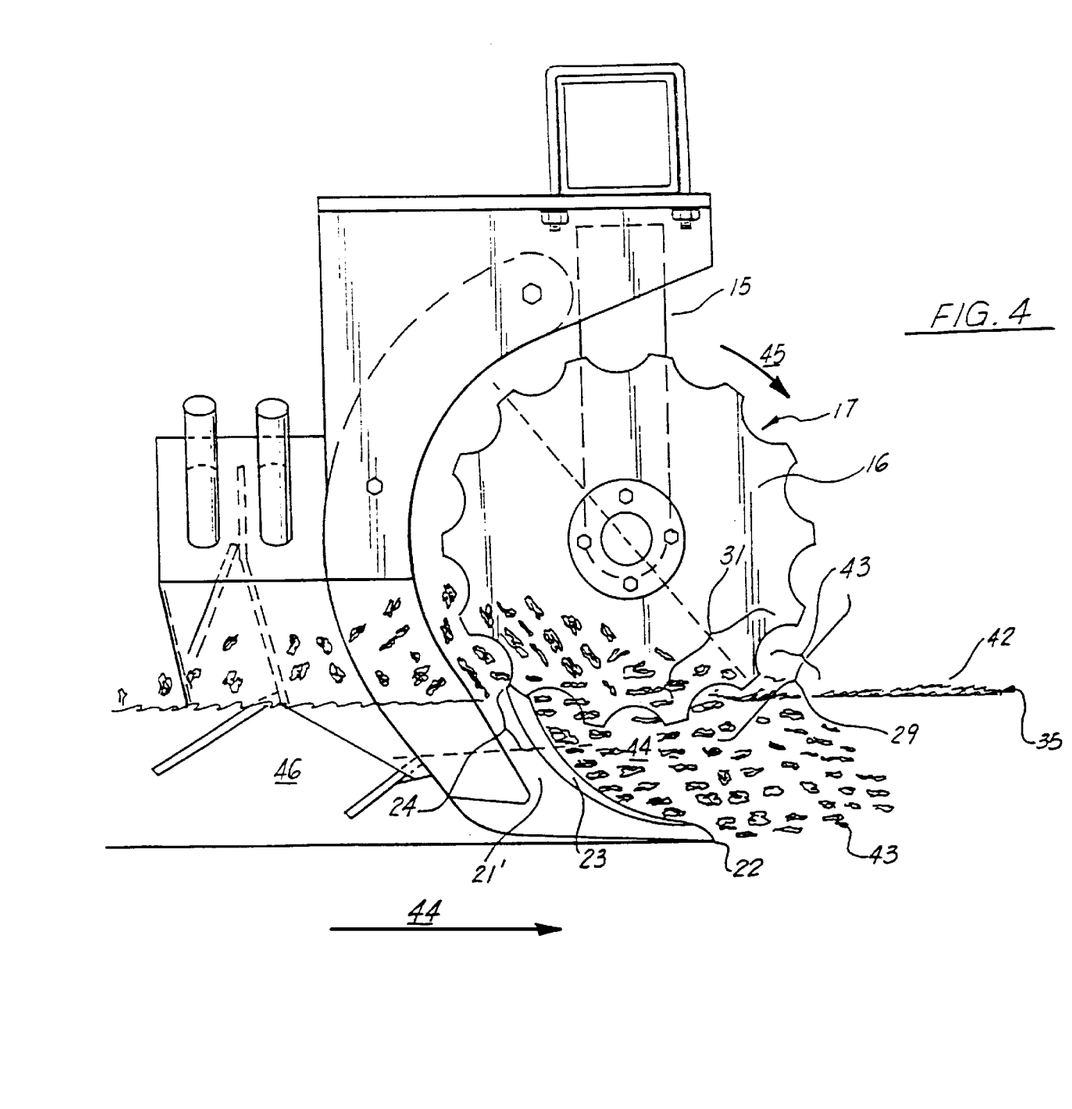
FIG. 4 is a side, partially cut-way view of the minimum tillage planter/renovator of FIG. 3A, illustrating the forming of the furrow/seedbed, and associated cutting/chopping of ground cover in the vicinity of the furrow.

Continuing with FIG. 4, the sod and trash is forced up and cut in short lengths by the rotating scalloped edges of the disc coulters. (The sod is heaving up from ground surface level by the forward eruption created ahead of ripping point), cut again in short lengths at the lowest point of the coulters, and again where the coulters edges are closest to the foot shank at 47. This multiple cutting is caused by the increasing distance between the coulter blades as they travel to the rear and receive the broken and heaving soil from directly beneath them. As the ground cover passes by the ripping point head, a shearing action occurs.

Additionally, the upper lifting end of the foot shank is stopping the flow of fine cut up materials, causing the material positioned between the coulters to roll, thereby causing more cutting, as the scallops in the coulters and a holding area cavity is formed in an area between the coulters placed in their dual angled directions, and the wide head at the top of the foot shank 21'. The coulter scallops recut the trash and soil as it rolls around in the area above the foot shank, between the coulters, thereby providing grinding means for chopping and grinding ground cover engaging the leading edge of said coulter arrangement, the ground material filtering out through the scallops, and is returned to the furrow as a fine tilth from all of the repeated cutting actions, providing a redeposit means for filling the furrow with tilth, the non-ground trash being displaced from the furrow area by the scalloped coulters, all creating:

1. A perfect seedbed
2. A positive cut of even spongy, wet soft sod that leaves the desired spacing (generally about 1½") approximate opening in the furrow at the surface that will not close back up, because the material was forced into a controlled cutting/slicing action and not allowed to spring out beyond the cutting and grinding action of the ripping point and mole plows.

Thereby providing a low tillage planting system wherein there is:

1. Less weight required.
2. A positive forced cutting of trash and more mulching grinding of trash and soil into a better seedbed tilth.
3. The furrow opening width cannot close back up preventing sunlight entrance, etc.
4. It is possible for a much more compact designed planter.

NEW, PREFERRED EMBODIMENT OF THE INVENTION

Figure 5A:
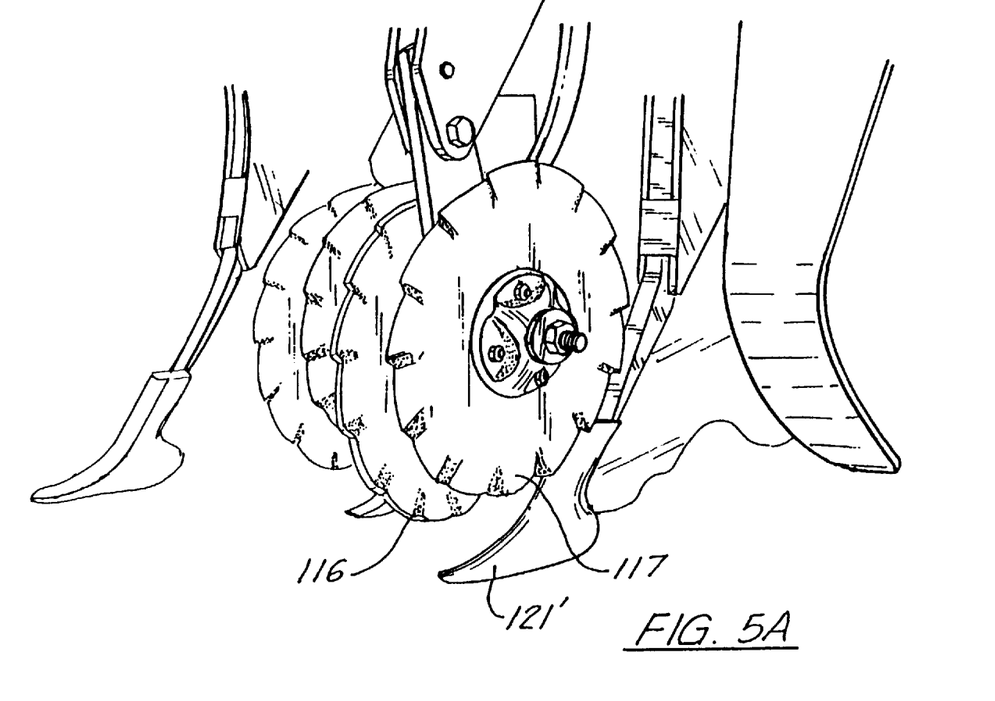
FIG. 5A is a side, isometric view of the preferred embodiment of the minimum tillage planter/renovator of the system of the present invention.
Figure 5B:
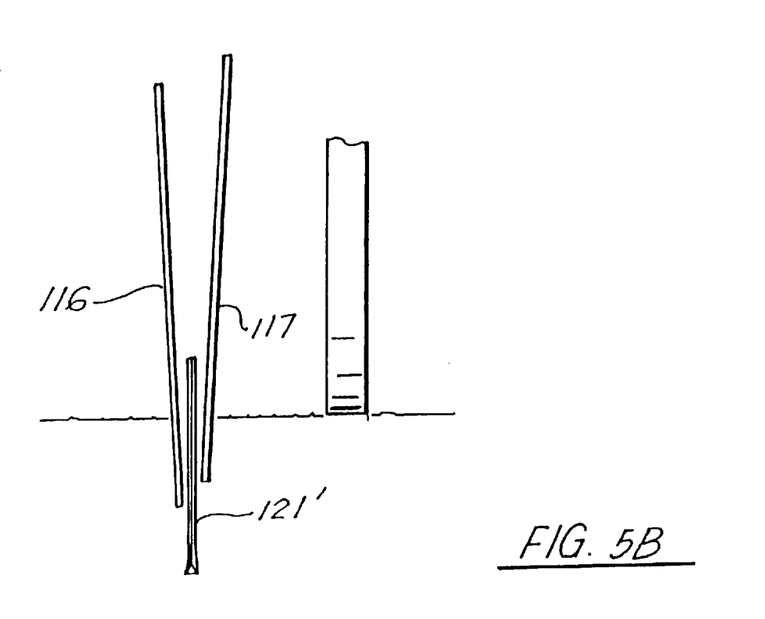
FIG. 5B is an illustrative drawing indicating the general positions of the first and second coulters relative to the foot shank and ground level of the invention of FIG. 5A.
Figure 5C:
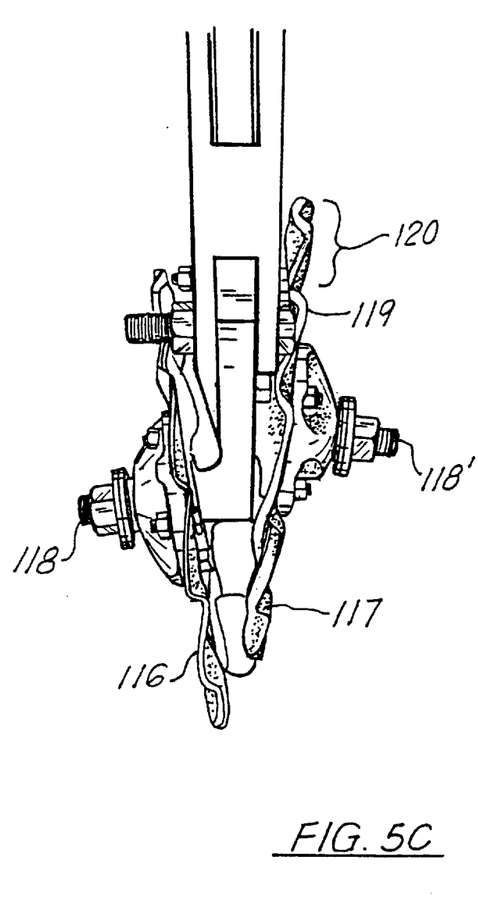
FIG. 5C is an upper, frontal view of the first and second rippled coulters as pivotally retained by a support member and frame.
Figure 5D:
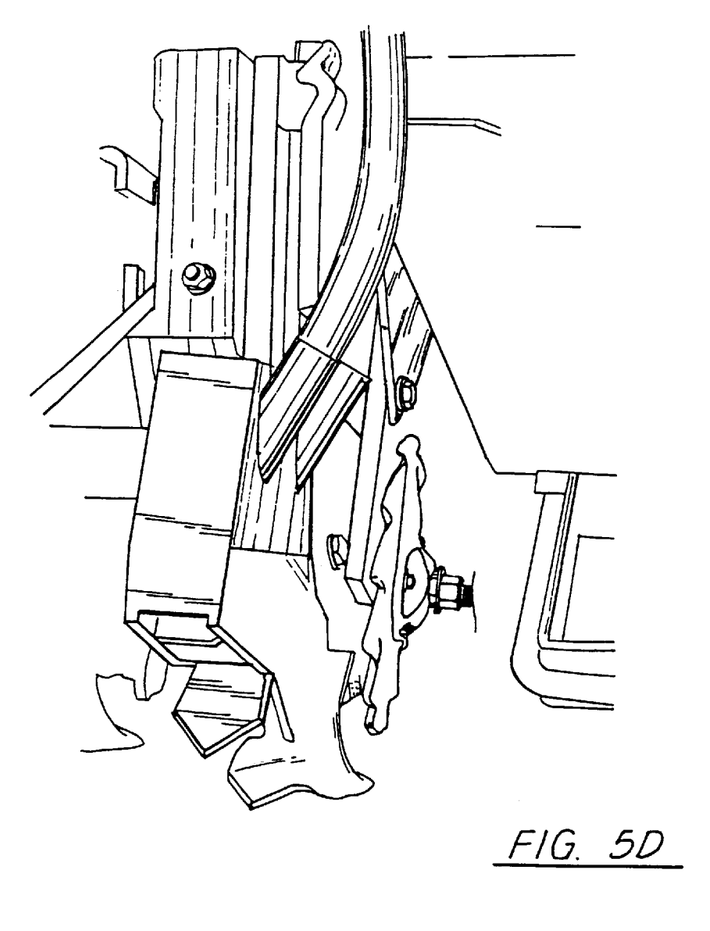
FIG. 5D is a rear, isometric view of the planter/renovator of FIG. 5A, indicating the position of the first coulter and support member relative to the foot shank, frame, and rear planter arrangement.
Figure 5E:
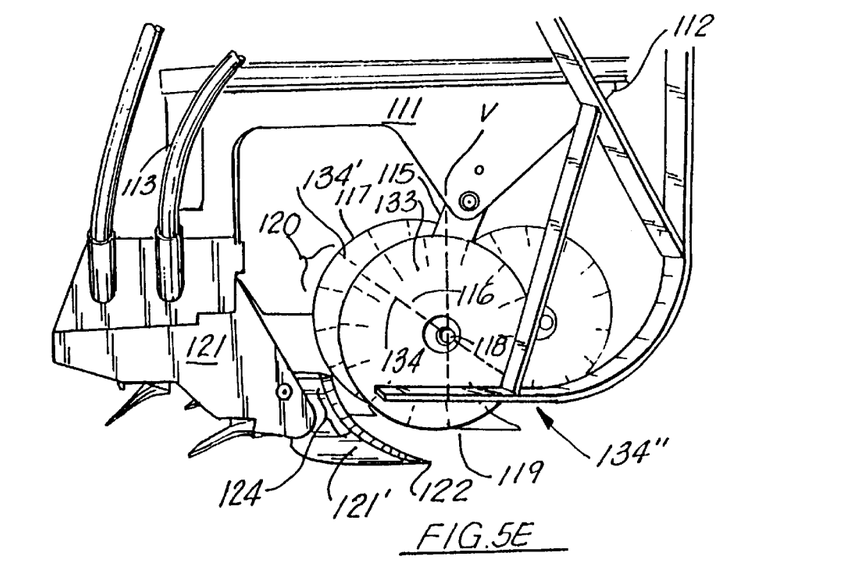
FIG. 5E is a side view of the planter/renovator of FIG. 5A, indicating the position of the first and second coulters relative to the foot shank, frame, and rear planter arrangement.
Figure 5F:
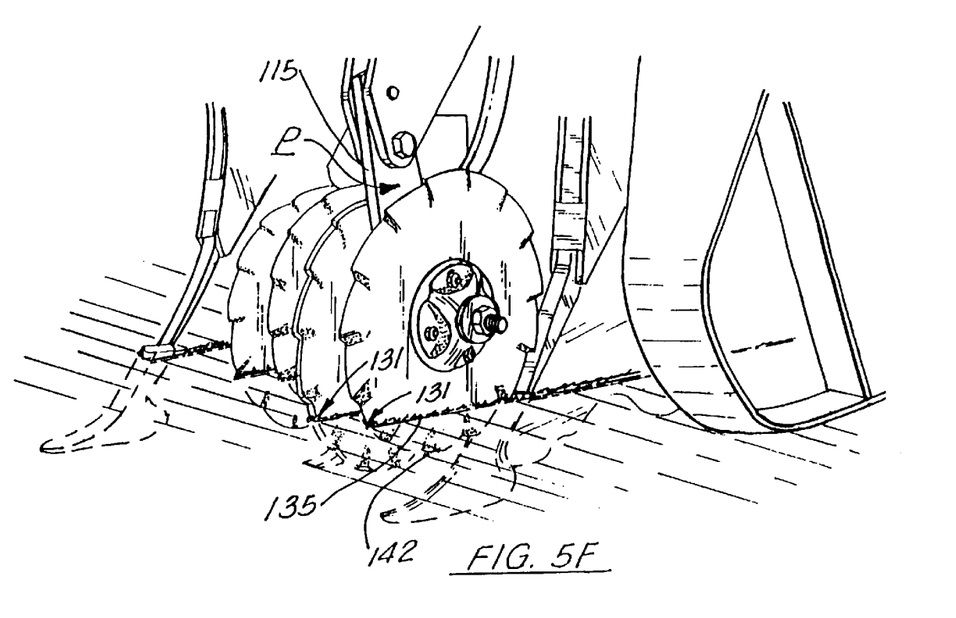
FIG. 5F is a side, isometric view of the invention of 5A, illustrating an implement having multiple sets of foot shanks and corresponding coulters in operation.

A new, preferred embodiment of the invention is disclosed in FIGS. 5A–5F, particularly FIG. 5E, comprising a frame 111 having a first, frontal end 112 and a second, rear end 113. The unit may be motivated via a standard, three point hitch, which may be utilized by a tractor or other implement to motivate the present system, as shown in the discussion of the first embodiment of the invention.

Continuing with the drawings, emanating from the frame 111 in the vicinity of the first end 112 in angled fashion pivotal support member 115, configured to support first 116 and second 117 coulter discs about said support member, via respective axles 118 in angled relationship, as will be further discussed infra. As shown, the outer diameter 119 of the coulter discs 116, 117 may be rippled 120, as better illustrated in FIG. 5C. This rippled outer diameter has been found to provide enhanced grinding and processing action of the organic matter and soil displaced by the footshank, when compared to the scalloped coulters illustrated in the first embodiment of the invention, supra.

Continuing with FIG. 5E, situated generally behind and generally aligned with the support member 115 is rear support member 121, supporting a foot shank 121' which curves about ninety degrees from a ripping point 122 to along an arc along a frontal face 124 which has an upper end situated generally above the ground line when in use, the foot shank having a configuration and operation corresponding with the disclosure in the first embodiment of the invention, supra.

Continuing with FIGS. 5A, 5B, 5C and 5E, the first 116 and second 117 coulters are supported via first and second axles 118, 118', respectively, such that the first coulter 116 is situated slightly forward of and generally below the second coulter 117, and each coulter is situated at an angle of about 4 degrees relative to the horizontal, although the working angle of such an arrangement can vary between an operative range of about 0–8+ degrees (depending upon soil conditions, operative criteria, etc.), said first and second coulters further each angled relative to the vertical at an angle of about seven degrees relative to the vertical, although the operative range of angles for such coulters, it is anticipated, can run between 0 to 25+ degrees, again depending upon the conditions; in the practice embodiment, 6 or 7 degrees is generally optimal, the discs may be angled 133 relative to the vertical V and line 134 so as to bring the first and second discs outer diameter 119 (which outer diameter is in the exemplary embodiment, for example, about 13") close together (which could comprise a spacing of about, for example, ⅛" to 1"+, depending upon the size, soil conditions, etc.) at the first end 134" of line 134, and at their widest spaced point at the second end 134' of line 134, an exemplary spacing of about, for example, 4 to 5 inches.

The first end 134" of line 134 may correspond generally with, slightly above, or slightly below the anticipated ground line of the system when in use, so that the discs may communicate with the ground cover initially at their closest point relative to one another, together forming a splitting and cutting, leading edge 131 (FIG. 5F) with the lowest portion 142 of the discs under the ground line 135 found generally below the front support member 115.

In the present, first exemplary embodiment of the invention, the two coulters are 13" in diameter with rippled cutting edges, as earlier indicated, although other diameter coulters may be employed in different scale systems and/or different operating conditions, with similar positive results. The 13" diameter has a needed radius proportioned to the size and the arc of the point for the scale of the exemplary embodiment, and may vary depending upon soil conditions and performance criteria. The is publicly available and may comprise, for example, part number TD99 available from Tarver Sales Corp of Folsom, LA, which is incorporated herein by reference.

Continuing with FIG. 5E, the front support 115 is pivotally attached to the frame to allow it to manually pivot P forward to allow for the user to remove rocks or the like if they may become lodged between a coulter and the ripping point. The forward motion of the frame drives the front support back to the operative position, and urges same to remain in operative position during operations.

In use, the present, preferred embodiment operates as the first embodiment supra, except that the staggered spacing of the first and second coulters above, the rippled outer diameter of the coulters (versus the old scallop design), and the pivot of the coulters, which is distinguishable from the first embodiment, all facilitate a more efficient, more consistent operation over the first embodiment and all known previous designs, and prior art systems.

The invention embodiments herein described are done so in detail for exemplary purposes only, and may be subject to many different variations in design, structure, Application and operation methodology. Thus, the detailed disclosures therein should be interpreted in an illustrative, exemplary manner, and not in a limited sense.

What is claimed is:

1. An enhanced minimum tillage planter/renovator system for preparing a seedbed and furrow in a strip of ground comprising soil having an upper surface, comprising:
    ripping means for penetrating the ground at a generally consistent depth below the upper surface, forming displaced soil, forming a furrow,
    lifting means associated with said ripping means for lifting said displaced soil and organic ground cover situated above said displaced soil, providing displaced organic ground cover;
    grinding means for engaging, severing and chopping said displaced organic ground cover, effectively breaking apart said displaced organic ground cover in such a manner as to form tilth, said grinding means further comprising:
        a first coulter situated in the vicinity of said ripping means, said first coulter configured to engage at least a portion of said ground cover displaced by said lifting means,
        a second coulter situated in the vicinity of said ripping means, said second coulter configured to engage, sever, and chop, in concert with said first coulter, said ground cover displaced by said lifting means;
    redeposit means for depositing said tilth into said furrow.

2. The enhanced minimum tillage planter/renovator system of claim 1, wherein said first and second coulters forming said grinding means have an outer diameter, and said outer diameter of said first and second coulters are rippled.

3. The enhanced minimum tillage planter/renovator system of claim 1, wherein said ripping means comprises a foot shank having a ripping point, and said lifting means comprises a front face on said foot shank configured to guide said displaced soil and organic ground cover towards said first and second coulters.

4. The enhanced minimum tillage planter/renovator system of claim 1, wherein there is further provided a support member supporting said first and second coulters, said support member configured to pivot forward to further space said first and second coulters from said foot shank, so as to allow for the removal of debris lodged therebetween.

5. The enhanced minimum tillage planter/renovator system of claim 1, wherein said first and second coulters are spaced to form a leading edge situated generally in front of said ripping means, and wherein said first and second coulters are further spaced so as to form a holding area cavity in an area between the coulters placed in their dual angled directions, and generally enclosed by said ripping means, said holding area cavity comprising a grinding area for grinding said displaced soil.

6. The enhanced minimum tillage planter/renovator system of claim 1, wherein said first and second coulters are staggered, wherein a portion of said first coulter leads and is situated slightly below said second coulter.

7. The enhanced minimum tillage planter/renovator of claim 5, wherein said foot shank includes a first and second outer edge and a generally centrally situated leading edge, and wherein there is further provided a generally vertically situated leading slicing coulter situated in leading, offset relationship from said leading edge of said foot shank, said slicing coulter generally aligned with said first outer edge of said foot shank.

8. The enhanced minimum tillage planter/renovator system of claim 1, wherein said first and second coulters forming said grinding means have an outer diameter, and said outer diameter of said first and second coulters are scalloped.

9. The enhanced minimum tillage planter/renovator of claim 7, wherein said first coulter is situated generally adjacent to said second outer edge of said foot shank.

10. The enhanced tillage planter/renovator of claim 1, wherein there is further provided a frame having a front and rear end, and wherein there is further provided a planter component situated generally adjacent to said rear end of said frame.

11. The enhanced minimum tillage planter/renovator of claim 10, wherein there is further provided hitch means associated with the front end of said frame, for selectively hitching said frame to motive means for motivating said frame.

12. An enhanced minimum tillage planter/renovator system for preparing a seedbed and furrow in a strip of ground comprising soil having an upper surface, comprising:
    a foot shank having a ripping point configured to penetrate the ground at a generally consistent depth below the upper surface, forming a furrow, said foot shank further comprising a lifting edge configured to lift said soil, so as to provide displaced soil;
    a first coulter situated generally near said foot shank, said first coulter configured to engage at least a portion of said soil displaced by said foot shank,
    a second coulter situated generally above said foot shank, said second coulter configured to engage, sever, and chop, in concert with said first coulter, said soil displaced by said foot shank, so as to form tilth;
    redeposit means for depositing said tilth formed by said first and second coulters into said furrow.

13. The enhanced minimum tillage planter/renovator system of claim 12, wherein said first and second coulters forming said grinding means have an outer diameter, and said outer diameter of said first and second coulters are rippled.

14. The enhanced minimum tillage planter/renovator system of claim 12, wherein there is further provided a support member supporting said first and second coulters, said support member configured to pivot forward to further space said first and second coulters from said foot shank, so as to allow for the removal of debris lodged therebetween.

15. The enhanced minimum tillage planter/renovator system of claim 12, wherein said first and second coulters are spaced to form a leading edge situated generally in front of said ripping point, and wherein said first and second coulters are further spaced so as to form a holding area cavity in an area between the coulters placed in their dual angled directions, and generally enclosed by said foot shank.

16. The enhanced minimum tillage planter/renovator system of claim 13, wherein said first and second coulters are staggered, wherein a portion of said first leads and is situated slightly below said second coulter.

17. The enhanced tillage planter/renovator of claim 12, wherein there is further provided a frame having a front and rear end, and wherein there is further provided a planter component situated generally adjacent to said rear end of said frame.

18. The enhanced minimum tillage planter/renovator of claim 12, wherein there is further provided hitch means associated with the front end of said frame, for selectively hitching said frame to motive means for motivating said frame.

19. The method of forming a seedbed and furrow in a strip of ground comprising soil covered by an organic ground cover, comprising the steps of:
   a. using a foot shank having a ripping point, a lifting edge, and a tapered spreading area to penetrate the ground at a generally consistent depth below the ground cover, forming a seedbed void and displaced soil;
   b. lifting said displaced soil and organic ground cover situated above said displaced soil, providing displaced soil and displaced organic ground cover;
   c. utilizing first and second coulters situated in the vicinity of said foot shank to concurrently engage, sever, and chop said displaced organic ground cover and, effectively breaking apart said displaced organic ground cover, forming tilth
   d. depositing said tilth into the formed seedbed void.

20. The method of forming a seedbed and furrow in a strip of ground comprising soil covered by an organic ground cover, comprising the steps of:
   a. penetrating the ground at a generally consistent depth below the ground cover, forming a seedbed void and displaced soil;
   b. lifting said displaced soil and organic ground cover situated above said displaced soil, providing displaced soil and displaced organic ground cover;
   c. utilizing first and second coulters to concurrently engage, sever, and chop said displaced organic ground cover and, effectively breaking apart said displaced organic ground cover, forming tilth
   d. depositing said tilth into the formed seedbed void.

* * * * *